(No Model)
H. O. STARNES.
COMBINED PLANTER AND FERTILIZER DISTRIBUTER.
No. 585,294. Patented June 29, 1897.
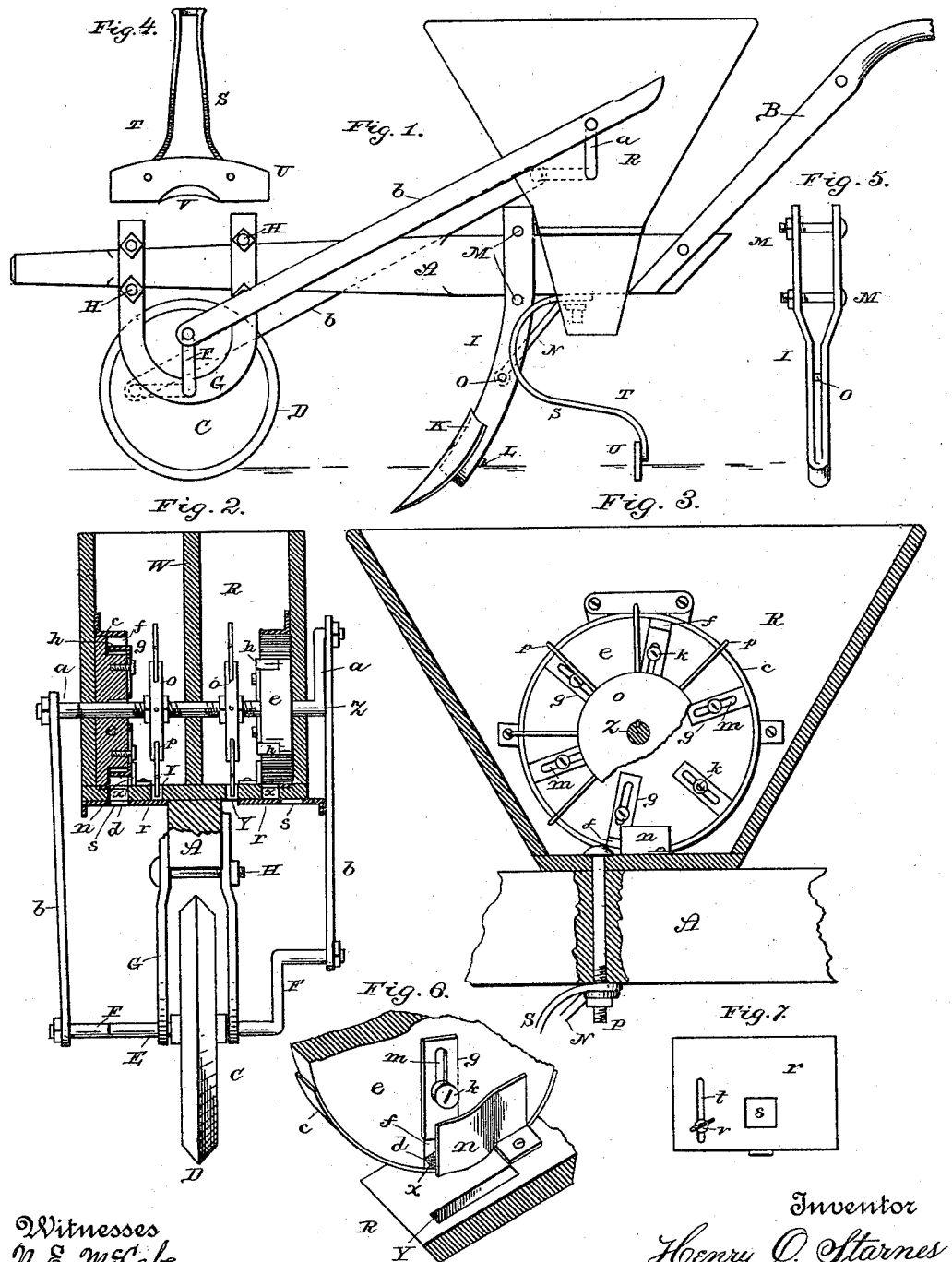
Witnesses
N. E. McCabe.
Arthur Browning
Inventor
Henry O. Starnes
per Bullock & Garner
Attorneys

UNITED STATES PATENT OFFICE.

HENRY O. STARNES, OF SAPA, MISSISSIPPI.

COMBINED PLANTER AND FERTILIZER-DISTRIBUTER.

SPECIFICATION forming part of Letters Patent No. 585,294, dated June 29, 1897.

Application filed January 18, 1897. Serial No. 619,603. (No model.)

*To all whom it may concern:*

Be it known that I, HENRY O. STARNES, a citizen of the United States, residing at Sapa, in the county of Webster and State of Mississippi, have invented a new and useful Improvement in a Combined Corn, Pea, and Cotton Planter and Fertilizer-Distributer, of which the following is a specification, reference being had to the accompanying drawings, forming a part thereof.

My invention relates to an improvement in combined corn, pea, and cotton planters and fertilizer-distributers; and it consists in the peculiar construction and combination of devices that will be more fully described hereinafter and particularly pointed out in the claims.

The object of my invention is to provide an efficient machine which is adapted to plant corn, peas, or cotton and at the same operation to sow fertilizer in the furrow with the seeds and which can be so adjusted as to plant any desired number of seeds in each hill and to plant the hills at any desired distance apart.

In the accompanying drawings, which illustrate my invention, Figure 1 is a side elevation of my improved planter and fertilizer-distributer. Fig. 2 is partly a vertical cross-sectional view taken through the center of the hopper and partly a front end elevation. Fig. 3 is a detailed vertical longitudinal sectional view taken through the hopper near the center thereof. Fig. 4 is a detailed front elevation of the coverer. Fig. 5 is a detailed front elevation of the standard. Fig. 6 is a detailed perspective view showing a portion of one of the seed-wheels, the annulus, one of the seed-cups or recesses, the gage therein, a portion of the bottom of the hopper, with the discharge-opening in the latter, together with the slotted opening thereof for the stirring-arms of the fertilizer and seed stirrer, and also showing the construction and arrangement of the cut-off plate. Fig. 7 is an inverted detailed plan view of one of the slide-plates.

A represents the beam, to the rear end of which are bolted the handles B.

C represents the colter, which is a circular disk or wheel, made preferably of metal, and having its periphery beveled on opposite sides to form a cutting angle D, which enters the soil in advance of the shovel or furrow-opener and serves to guide the latter, the cutting angle of the colter serving to prevent the latter from moving or slipping sidewise while the machine is in motion, and thereby facilitating the course of the planter in a straight line. This colter is fast to a shaft E, the ends of which are provided with cranks F, arranged at an angle to each other, preferably at about right angles, as shown. The shaft is journaled in a pair of U-shaped hangers G, the arms of which are arranged on opposite sides of the beam near the front end of the latter and secured thereto by bolts H, arranged above and below the beam, but not passing through the latter. Hence the strength of the beam is in no wise impaired, while the bolts serve to fasten the hangers securely in place and admit of their being removed from the beam when desired.

I represents the standard, which is substantially U-shaped in front elevation, and to the lower portion of which is secured the shovel or furrow-opener K by means of a bolt L. The standard is made from a single flat bar of steel or iron bent in the form shown, and the upper arms of the standard pass on opposite sides of and embrace the beam and are secured thereto by bolts M above and below the beam, thus enabling the standard to be readily removed from the beam when desired. A brace-rod N has its lower end secured between the sides of the standard by a bolt O, and the upper end of said brace-rod extends to the under side of the beam at a point in rear of the standard and is secured thereto by a vertical bolt P, which bolt extends through the beam, the bottom of the hopper R, and the upper end of the trail-arms S of the coverer T. The upper end of the trail-arms are clamped between the beam and the brace-rod, as shown, and the bolt P serves to secure the brace-rod, trail-arms, and hopper firmly to the beam and to admit of their being removed therefrom. The trail-arms of the coverer are formed by being bent from a single bar of iron or steel and curved in the form shown, and to the lower ends of the trail-arms, on the front sides thereof, is secured a covering board or foot U, which is arranged transversely with relation to the line of draft and has a sector-shaped recess or opening V on its lower side.

The hopper R is divided longitudinally into two compartments by means of a partition-board W. In the bottom of each compartment is an opening X and a longitudinal or slotted opening Y. A shaft Z is journaled in bearings formed in the sides of the hopper and extends transversely through the center thereof and is provided at its ends with cranks $a$, arranged at about right angles to each other and which are connected to the cranks F of the colter by means of connecting-rods $b$, as shown, whereby the rotary motion of the colter is communicated to the hopper-shaft Z when the machine is in motion, as will be readily understood.

In each compartment of the hopper is located a seeding mechanism, the construction and operation of which are as follows:

On the inner side of the hopper is secured an annulus or collar $c$, which is circular in shape and has an opening $d$ on its lower side, which registers with the contiguous opening X in the bottom of the hopper. Bearing against the inner side of the wall or side of the hopper and fitting snugly within and adapted to revolve in the annulus or collar is a seed-wheel $e$, which is keyed or otherwise secured to the shaft Z and adapted to revolve therewith. The seed-wheel has a series of radial recesses $f$, which extend to its periphery, and these recesses may be of any desired number and are placed at regular distances apart. In each recess is placed a gage $g$, which corresponds in size and shape with a transverse section of the recess and has an arm or plate $h$, which bears against the side of the seed-wheel.

A set-screw $k$ operates in a slot $m$ in the arm or plate and enters the seed-wheel, and is thereby adapted to retain the gage at any desired adjustment, and hence the gage may be so set as to open or close the recess or seed-cup to any desired extent and hence reduce or enlarge its capacity to any desired number of seeds, whether of corn, peas, or other kinds. By moving the gage out to the periphery of the seed-wheel and securing it at that adjustment the recess or seed-cup will be entirely closed to the admission of seeds, and hence the cup or recess will be out of operation. Hence any desired number of the cups or recesses may be closed, and in this manner the distance between the hills of seeds planted in the furrows may be regulated, as will be readily understood.

To the bottom of the hopper in each compartment thereof is secured a cut-off plate $n$, which bears against the seed-wheel and serves to cut off each seed-cup or recess successively from communication with the interior of the compartment when the recess or seed-cup is at the bottom of the hopper and in communication with the opening X. The cut-off plate thus prevents the seeds in the hopper from escaping through the opening X and permits only those seeds which are within the recesses or seed-cups to be discharged from the hopper when the machine is in operation. Also, secured to the shaft Z and arranged one in each compartment of the hopper is a stirrer $o$, which is circular in form and is provided with stirring-arms $p$. The stirrers are arranged in the compartments of the hopper in such relation above the openings Y that the arms of the stirrers move through said openings Y in succession as the stirrers rotate.

Under the bottom of the hopper are slide-plates $r$, each of which has an opening $s$, adapted to register with the contiguous opening X in the bottom of the hopper. When the slide-plate is moved in so far as to open the opening X, or, in other words, so as to cause its opening $s$ to register with the opening X, the inner portion of said slide-plate closes the opening Y, as shown, and when the opening Y is uncovered the opening X is closed. The slide-plate has a transverse slot $t$ at one end, and a set-screw $v$ in said slot enters the bottom of the hopper and serves to secure the slide-plate at any desired adjustment.

When corn or peas are in either or both compartments of the hopper, the stirrers serve to keep the seeds from becoming lodged or clogged therein. The stirrers are also adapted for forcing cotton-seed or fertilizer through the openings Y when the machine is used for planting cotton and for sowing fertilizer.

In order to plant corn or peas and to sow fertilizer at the same time, the plate under one compartment of the hopper is adjusted to uncover the opening X and close the opening Y thereof and the plate under the other compartment of the hopper is adjusted to uncover the opening Y and close the opening X. The seeds are placed in the first hopper, the seed-cups in the seed-wheel having been first previously arranged to plant the seeds at the required distance apart, as previously described, and the fertilizer is placed in the other compartment of the hopper, from which it will be fed by the stirrer therein, as has been described.

Having thus described my invention, I claim—

1. In a planter, the hopper having the compartments provided with the discharge-openings X, Y, in combination with the seed wheel and stirrer arranged in each compartment, and the slide-plates, having the openings $s$, adapted to register with the openings X, whereby the openings X, Y, of the hopper-compartments may be alternately opened or closed, for the purpose set forth, substantially as described.

2. In a planter, the combination with the hopper having the discharge-opening X and annulus $c$, of the seed-wheel $e$ having the radial recesses $f$ forming the seed-cups, the gages $g$ in said seed-cups having the arms or plates $h$ bearing against the side of the seed-wheel, said arms or plates having the slots $m$ and set-screws $k$ in said slots and entering the seed-wheel, for the purpose set forth, substantially as described.

3. In a planter, the combination with the hopper having the discharge-opening, the seed-plate arranged vertically in one side of the hopper and having the radial seed-cups or recesses adapted to successively register with the discharge-opening of the hopper as the seed-wheel rotates, with the plate $n$ secured to the bottom of the hopper and bearing against the exposed side of the seed-wheel, for the purpose set forth, substantially as described.

4. In a planter, the combination with the beam of the standard having the brace-bar, the coverer having the upper end of its arms arranged between the brace-bar and the beam, the hopper arranged on the beam, and the bolt P, passing through the bottom of the hopper, the beam and also through the brace-rod and arms of the coverer, for the purpose set forth, substantially as described.

HENRY O. STARNES.

Witnesses:
T. W. COOPER,
F. N. ARNOLD.